United States Patent [19]

Whyte

[11] 4,012,733
[45] Mar. 15, 1977

[54] DISTRIBUTION POWER LINE COMMUNICATION SYSTEM INCLUDING A MESSENGER WIRE COMMUNICATIONS LINK

[75] Inventor: Ian A. Whyte, Pittsburgh, Pa.

[73] Assignee: Westinghouse Electric Corporation, Pittsburgh, Pa.

[22] Filed: Oct. 16, 1975

[21] Appl. No.: 622,915

[52] U.S. Cl. .................... 340/310 A; 179/2.5 R; 340/310 R

[51] Int. Cl.² ............................. H04M 11/04

[58] Field of Search ..... 340/310 R, 310 A, 310 CP; 179/2.5 R

[56] References Cited

UNITED STATES PATENTS

| | | | |
|---|---|---|---|
| 1,062,083 | 5/1913 | Creighton | 340/310 R |
| 1,518,683 | 12/1924 | Baker | 340/310 R |
| 1,657,248 | 1/1928 | Dubilier | 340/310 R |
| 1,859,066 | 5/1932 | Baker | 340/310 R |
| 3,942,168 | 3/1976 | Whyte | 340/310 R |

*Primary Examiner*—John W. Caldwell
*Assistant Examiner*—James J. Groody
*Attorney, Agent, or Firm*—R. W. Smith

[57] ABSTRACT

A distribution power line communication system wherein communication signals are transferred between a communication terminal at a substation and communication terminals at customer locations. The communication signals are transferred between the terminals by using a two-conductor line, with one of the conductors effectively grounded and with the other of the conductors effectively isolated from ground. The conductor which is isolated from ground provides a conduction path which travels along the primary distribution line to a distribution transformer location. At this location, the conduction path is transferred to a messenger wire which supports other transmission lines between various distribution transformer locations. The messenger wire is suitably isolated from ground and the conduction path is transferred to separate secondary distribution lines adjacent to the messenger wire. The final portion of the ground-isolated conduction path which directs signals to the communication terminals at the customer locations is provided by the secondary distribution lines and by the service lines extending to the customer locations.

1 Claim, 5 Drawing Figures

DISTRIBUTION POWER LINE COMMUNICATION SYSTEM INCLUDING A MESSENGER WIRE COMMUNICATIONS LINK

BACKGROUND OF THE INVENTION

1. Field of the Invention

This invention relates, in general, to power line communication systems and, more specifically, to conductor arrangements for transferring communication signals between primary and secondary power distribution lines.

2. Description of the Prior Art

Automated power distribution systems which perform various functions, such as remote meter reading and selective load reducing, require the use of a distribution power line communication system. The distribution portion of the communication system conveys information between a substation and the electrical load at the customer location. This information must be transferred along the subtransmission or primary distribution line, the secondary distribution lines, and the service lines which extend to the customer locations.

Many different types of distribution power line communication systems have been described in the literature and have been used to some extent for actual communication purposes. One type of communication system transfers signals along the primary portion of the distribution system by using one of the high-voltage conductors and the common neutral return or ground conductor. Other types of communication systems use two of the high-voltage conductors. With either method, difficulty is encountered due to power factor correcting capacitors connected to the primary distribution line which severely attenuate the communication signals. Other types of communication systems have been used, but the problems of considerable signal attenuation and multipath propagation have not been satisfactorily solved.

The use of existing conductors located along the power distribution system is advantageous from the standpoint of providing an economical communication system. Consequently, it is advantageous to use a minimum amount of additional equipment or facilities to provide the carrier communication system. In addition, expensive components, such as couplers between the primary and secondary distribution lines, must be used sparingly to provide an economical communication system. Therefore, it is desirable, and it is an object of this invention, to provide an economical distribution power line communication system which provides high quality information transmission with a minimum of additional cost to the power distribution system.

SUMMARY OF THE INVENTION

There is disclosed herein a new and useful arrangement for economically providing a suitable communication system along the distribution portion of a power transmission facility. The communication system makes maximum use of existing facilities to reduce the cost of additional components required to provide the communication system.

The distribution portion of the communication system extends between a substation communication terminal and communication terminals at customer locations. The communication terminal at the substation is coupled to one of the high-voltage conductors of the subtransmission or primary distribution line. At the location where a distribution transformer is connected to the primary distribution line, the conductor carrying the communication signal is coupled to a metallic wire which is normally used to support another type of transmission line, such as a telephone line. This metallic wire is used as one conductor of the portion of the communication system which conveys information across the primary portion of the power distribution system.

The support or messenger conductor is coupled to the secondary portion of the distribution system at positions where the messenger wire is located conveniently to the secondary power distribution lines. The communication signal is transferred between the locations where the messenger wire is coupled to the secondary distribution lines and the customer loads by propagation along the secondary distribution lines and the service lines extending to the customer locations.

By using the messenger wire arrangement disclosed herein, only one connection to the primary portion of the distribution line is necessary to serve several separate secondary portions of the distribution line. Thus, a significant reduction in the number of relatively expensive coupling devices used to couple the primary distribution line to the secondary distribution lines can be achieved. In addition, since a major portion of the communication path does not extend along the entire primary distribution line, the effect of power factor correcting capacitors positioned along the primary portion of the distribution line is reduced.

BRIEF DESCRIPTION OF THE DRAWING

Further advantages and use of this invention will become more apparent when considered in view of the following detailed description and drawing, in which.

DESCRIPTION OF THE PREFERRED EMBODIMENTS

Figure 1:
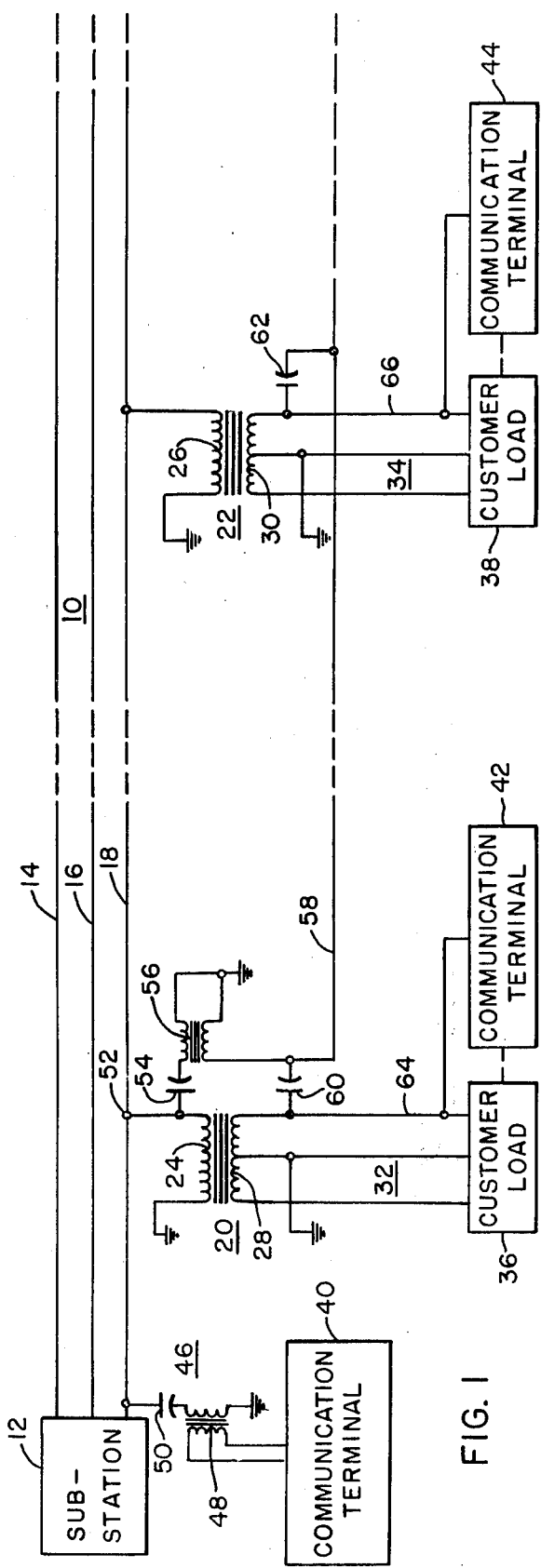
FIG. 1 is a schematic diagram of a communication system constructed according to this invention.

Throughout the following description, similar reference characters refer to similar elements or members in all of the figures of the drawing.

Referring now to the drawing, and to FIG. 1 in particular, there is shown the distribution portion of an electrical power system which is arranged for the transfer of communication signals across the distribution system. The subtransmission or primary distribution line 10 receives electrical energy from the substation 12 which would normally be connected to a high-voltage transmission line. The distribution line 10 illustrated in this specific embodiment includes the phase conductors 14, 16 and 18. Although represented as a three-conductor three-phase line, a single phase line may be used within the contemplation of this invention.

The distribution transformers 20 and 22 are connected to the phase conductor 18 of the primary distribution line 10 and to ground. Thus, electrical energy may be transferred from the primary windings 24 and 26 to the secondary windings 28 and 30 of the distribution transformers 20 and 22. The secondary distribution lines 32 and 34 transfer electrical energy from the distribution transformers to the customer loads 36 and 38. As illustrated in FIG. 1, the secondary distribution lines 32 and 34 include the service lines which normally extend from a customer load to the pole on which the distribution lines are connected. Although only two distribution transformers are illustrated in FIG. 1, it is within the contemplation of this invention that more than two distribution transformers may be used with the communication system of this invention.

The desired communication link exists between the communication terminal 40 which is located at the substation 12 and the communication terminals 42 and 44 which are located at the customer load locations. Normally, these communication systems are of the two-way type in which signals are generated and received by each communication terminal. In describing the path of the communication signal between the communication terminals in this specific embodiment, the direction of communication propagation will be assumed to be from the substation communication terminal 40 to the customer load communication terminals.

The communication terminal 40 generates a communication signal between ground potential and the phase conductor 18 by use of a signal coupler 46 which includes the coupling transformer 48 and the capacitor 50. The communication signal is propagated along the conductor 18 until it reaches the terminal 52 of the distribution transformer 20. Assuming that any power factor correcting capacitor banks are connected to the primary distribution line 10 beyond the distribution transformer 20, negligible attenuation of the communication signal arriving at the terminal 52 is caused by the capacitor banks. The communication signal applied to the distribution transformer 20 is coupled, through the coupling capacitor 54 and the coupling transformer 56, to the conductor 58. A repeater or signal amplifier may be used to transfer communication signals between the terminal 52 and the conductor 58.

Figure 3:
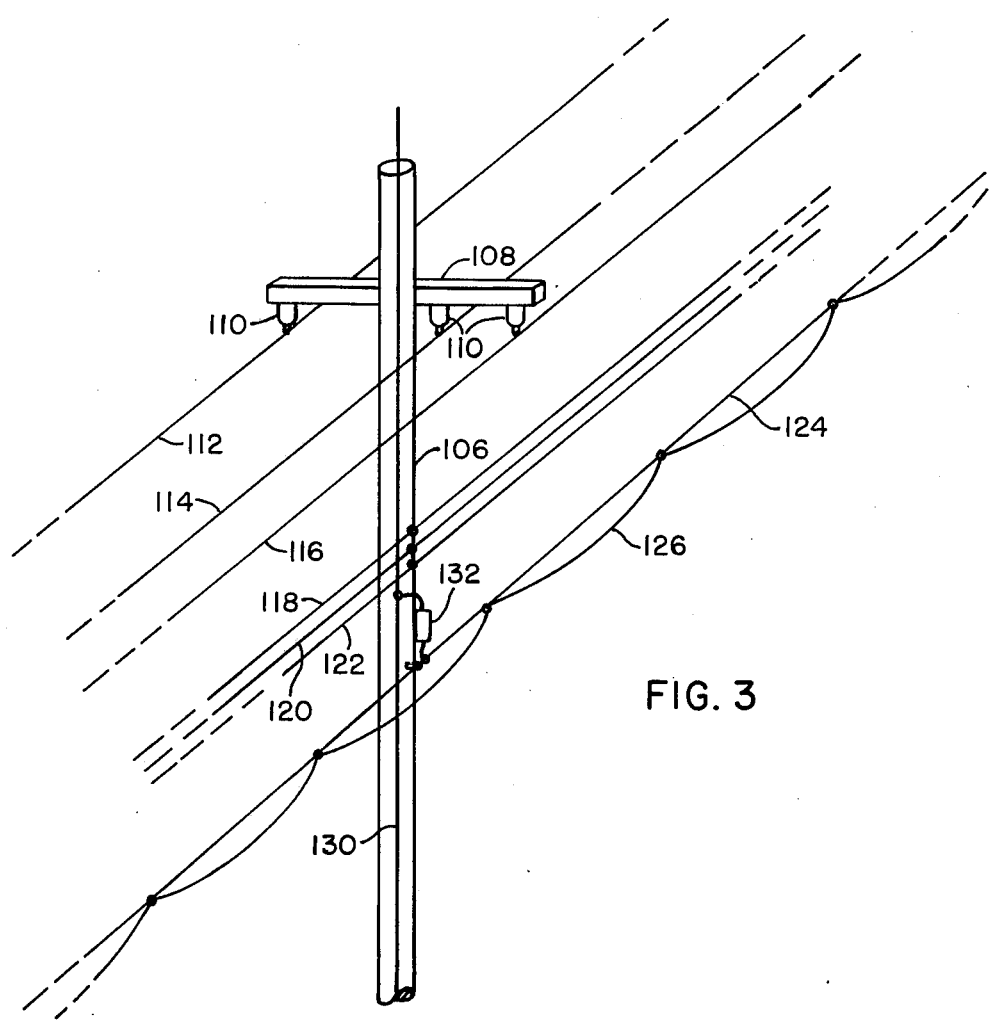
FIG. 3 is a view illustrating the physical arrangement of a communication system according to this invention.

Conductor 58 is an electrical conductor which is independent of the primary or secondary distribution lines and has a high resistance compared to the conductors of the primary and secondary distribution lines. Thus, the conductor 58 is not used for the transmission of electrical energy between the various locations in the primary distribution system. Such a conductor may consist of the support or messenger wire which is normally used to support other transmission lines, such as telephone lines and community antenna television cables, between conventional power line supporting structures. FIG. 3, which will be referred to hereinafter in more detail, illustrates the use of a messenger wire to support another transmission line between poles.

The conductor 58 is used to provide part of the communication signal path between the various distribution transformers connected to the primary distribution line 10. The conductor 58 is coupled to the secondary distribution lines 32 and 34 by the coupling capacitors 60 and 62, respectively. At the customer loads, the conductors 64 and 66 are appropriately connected to the communication terminals 42 and 44, respectively. Thus, a communication path exists between the messenger wire or conductor 58 and the communication terminals associated with the various customer loads which are supplied by the power distribution system.

Figure 2:
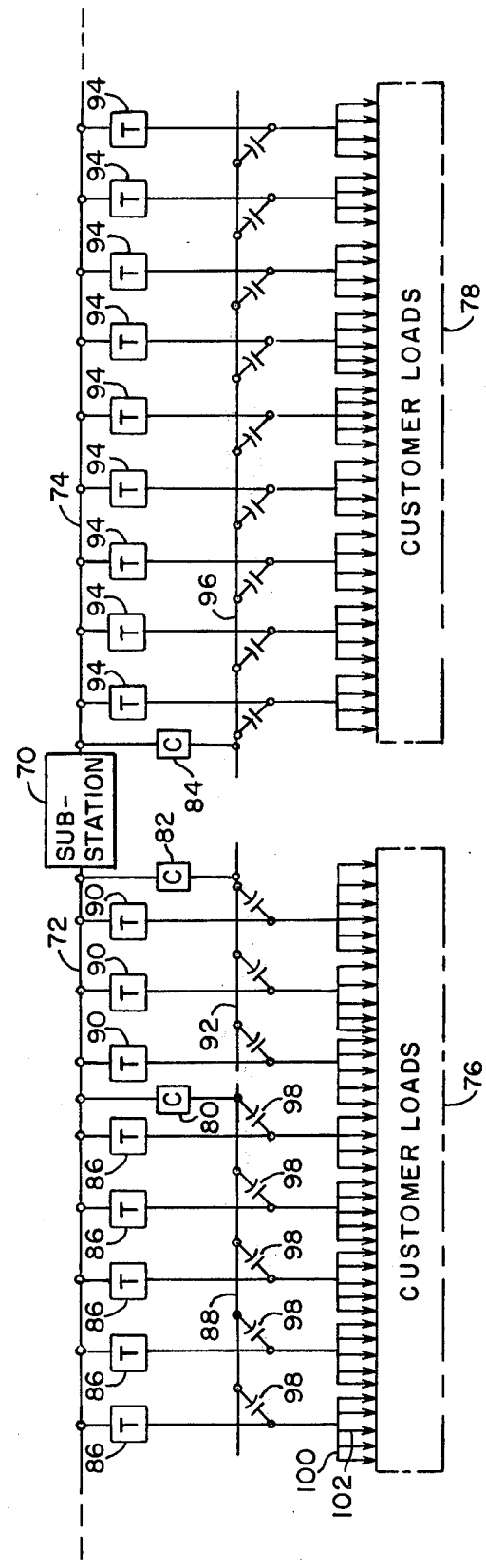
FIG. 2 is a block diagram of a communication system constructed according to this invention.

FIG. 2 is a block diagram of the arrangement shown in FIG. 1 with more distribution transformers illustrated to indicate the interconnections between the system elements. The system substation 70 delivers energy to the primary distribution lines 72 and 74 and, through the distribution transformers T, to the customer loads 76 and 78. Communication signals applied to the primary distribution lines 72 and 74 at the substation 70 are propagated outwardly from the substation 70 to the signal couplers 80, 82 and 84. These couplers may be constructed from suitable isolating components, such as the transformer 56 and capacitor 54 shown in FIG. 1.

The location of a signal coupler is determined primarily by the continuity of the messenger wire between the various secondary distribution lines associated with the power distribution system. In general, only one signal coupler is needed for each portion of the distribution system wherein the secondary distribution line is accessible to the same messenger wire or conductor. Therefore, differing numbers of distribution transformers and secondary distribution lines may be associated with a particular signal coupler. For illustrative purposes, FIG. 2 indicates the use of the signal coupler 80 with the distribution transformer 86 and the messenger wire 88. Similarly, the signal coupler 82 is associated with the distribution transformers 90 and the messenger wire 92, and the signal coupler 84 is associated with the distribution transformers 94 and the messenger wire or conductor 96. Therefore, it can be seen that communication signals are required to be propagated along the distribution lines 72 and 74 only as far as the furthest signal coupler.

Communication signals propagated along the distribution line 72 are transferred to the conductor or messenger wire 88 by the signal coupler 80. By suitable coupling apparatus, indicated generally by the coupling capacitors 98, the communication signals on the messenger wire 88 are transferred to secondary distribution lines, such as the line 100, which are associated with the distribution transformers 86. The communication signal is transferred from the secondary distribution lines through service lines, such as the line 102, to the various customer loads 76. Thus, only one signal coupler is required between the high-voltage primary distribution line 72 and the lower voltage components of the communication system where such components are associated with a common messenger wire. Coupling of the communication signals to the other service lines illustrated in FIG. 2 is accomplished by similar apparatus, with the major distinction illustrated in FIG. 2 being the number of distribution transformers associated with a particular messenger wire. It is emphasized that the signal path described is the path conducted by the portion of the communication signal transmission system which is isolated from ground potential that is, is "above ground." The return or second conductor of the communication system is provided by the grounded conductors of the electrical power system. In addition, it may be practical in some installations to connect together two or more, messenger wires by appropriate conductors to extend the useful range of a messenger wire and reduce the number of required couplers.

FIG. 3 is a view illustrating a conventional electrical power system pole arrangement wherein a messenger wire is utilized. The pole 106 supports the cross-arm 108 and the insulators 110. The primary distribution line consists of the conductors 112, 114 and 116. The secondary distribution line consists of the conductors 118, 120 and 122. The messenger wire 124 extends between the pole 106 and the adjacent poles to help support the cable 126.

Coupling of the communication signal to the secondary distribution line conductors 118, 120 and 122 is not indicated in FIG. 3. Normally, this would be accomplished at the location in the power distribution system where the secondary distribution line is connected, through a distribution transformer, to the primary distribution line. Also, the service lines which would be connected to the secondary distribution lines shown in FIG. 3 are not illustrated in the interest of clarity.

In some installations, the messenger wire 124 is not directly connected to ground potential throughout the distribution system. Therefore, the messenger wire 124 can be used conveniently as a conductor for the "above ground" portion of the communication signal path. However, when an electrical ground is desired between the messenger wire 124 and a conductor at ground potential, such as the ground wire 130, a suitable isolator 132 may be provided. The isolator 132 isolates the messenger wire 124 from ground potential at the carrier communication frequencies.

Figure 4:
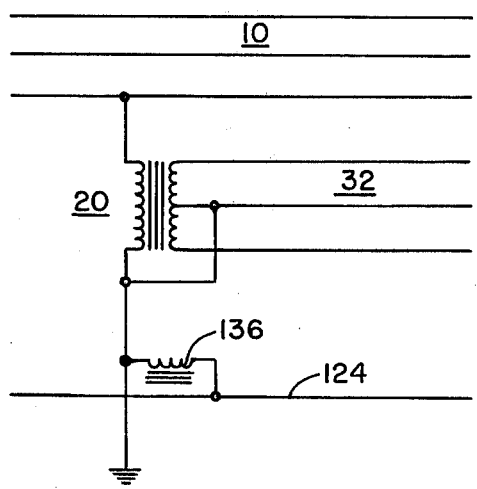
FIG. 4 is a schematic diagram illustrating an arrangement for isolating a messenger wire from ground according to one embodiment of this invention.
Figure 5:
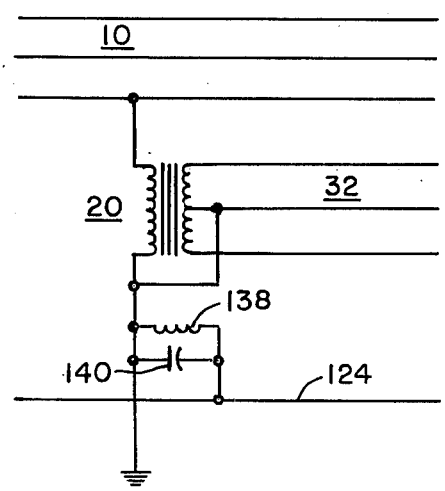
FIG. 5 is a schematic diagram illustrating an arrangement for isolating a messenger wire from ground according to another embodiment of this invention.

FIG. 4 represents schematically the connection of an isolator between the messenger wire 124 and ground potential. The isolator illustrated in FIG. 4 consists of an inductor 136 which has a relatively high impedance at the carrier communication frequency and a relatively low impedance at the power line frequency. FIG. 5 illustrates the use of an inductor 138 and a capacitor 140 connected in parallel to provide isolation between the messenger wire 124 and ground potential. This arrangement has the advantage that the isolator presents a relatively low impedance between the messenger wire 124 and ground potential at power line frequencies, and also presents a relatively low impedance at extremely high frequencies, such as frequencies present due to lightning surges.

The carrier communication signal arrangement described herein makes novel use of existing components often found in conventional power distribution systems. By suitable isolation of the messenger wire when needed, and by using the messenger wire as a part of the "above ground" path for the communication signal, an efficient substation to customer load communication path may be provided. In addition, the effect of attenuation of communication signals around distribution transformers is practically eliminated. Also, the requirement that a limited number of couplers are needed for connection to the high-voltage primary distribution line is attractive from an economic standpoint.

Since numerous changes may be made in the above described apparatus, and since different embodiments of the invention may be made without departing from the spirit thereof, it is intended that all of the matter contained in the foregoing description, or shown in the accompanying drawing, shall be interpreted as illustrative rather than limiting.

I claim as my invention:

1. A distribution power line carrier communication system transmitting carrier signals to electrical customer load locations served by a distribution power line system carried on support poles, said communication system comprising:

a primary line conductor of said distribution system transmitting said carried signals and carried by said support poles;

a plurality of secondary line conductors of said distribution system carried by predetermined ones of said support poles for connection to said customer load locations;

at least one distribution transformer connected between the primary and secondary distribution line conductors;

a cable supporting messenger wire having a high resistance and being suspended between said predetermined ones of said support poles;

frequency responsive impedance means connected between said messenger wire and ground potential, said impedance means having a high impedance at the carrier signal frequencies and a low impedance at the power line frequency;

first signal coupling circuit means connected between said primary line conductor and said messenger wire for transmitting carrier signals therebetween and around said one distribution transformer; and second signal coupling circuit means connected between said messenger wire and said plurality of secondary line conductors for transmission of said carrier signals between said messenger wire and said customer load locations.

* * * * *